(12) United States Patent
Wan et al.

(10) Patent No.: US 8,170,532 B2
(45) Date of Patent: May 1, 2012

(54) METHOD AND SYSTEM FOR IDENTIFICATION USING A PORTABLE WIRELESS COMMUNICATION DEVICE OF A PERSON

(75) Inventors: Cho Kwan Wan, Hong Kong (HK); Lok Sum Chui, Hong Kong (HK); Chun Wah Jo, Hong Kong (HK); Sui Hei Fung, Hong Kong (HK); Chun Fung Tai, Hong Kong (HK)

(73) Assignee: Hong Kong RFID Ltd., Shatin, N.T. (HK)

( * ) Notice: Subject to any disclaimer, the term of this patent is extended or adjusted under 35 U.S.C. 154(b) by 756 days.

(21) Appl. No.: 12/275,960

(22) Filed: Nov. 21, 2008

(65) Prior Publication Data
US 2010/0130176 A1    May 27, 2010

(51) Int. Cl.
*H04M 1/66* (2006.01)
(52) U.S. Cl. ...... 455/411; 455/41.2; 455/41.3; 455/418; 455/419; 455/420

(58) Field of Classification Search ............... 455/41.2, 455/41.3, 418, 419, 420, 410, 411
See application file for complete search history.

(56) References Cited

U.S. PATENT DOCUMENTS

| 6,865,372 B2 * | 3/2005 | Mauney et al. | 455/41.2 |
| 7,076,209 B2 * | 7/2006 | Sugikawa et al. | 455/41.2 |
| 7,149,532 B2 * | 12/2006 | Akama | 455/456.2 |

* cited by examiner

*Primary Examiner* — Temica M Beamer
(74) *Attorney, Agent, or Firm* — Muncy, Geissler, Olds & Lowe, PLLC

(57) ABSTRACT

A method for identification using a portable wireless communication device of a person, the method comprising: activating (62) an application installed on the device to enable wireless transmission of an identification code associated with the person; receiving (67) the identification code by a receiver; and performing (68) a predetermined operation by the receiver in response to the received identification code; wherein the identification code is transferable to another device and a privacy level is applied on the identification code to control the visibility of the identification code to other devices; and wherein the identification code is transmitted directly by a wireless transmitter of the portable wireless communication device to the receiver.

11 Claims, 6 Drawing Sheets

METHOD AND SYSTEM FOR IDENTIFICATION USING A PORTABLE WIRELESS COMMUNICATION DEVICE OF A PERSON

TECHNICAL FIELD

The invention concerns a method and system for identification using a portable wireless communication device of a person.

BACKGROUND OF THE INVENTION

While personal privacy is an important concern for the public, it is sometimes very useful to let others identify you in the case of emergency. For example, if you were involved an accident and become injured, your medical treatment history is important information for health care providers to be able to immediately access.

Mobile phones and other mobile devices such as PDAs, are widely used by the population. There is a desire to exploit the widespread usage of mobile devices in order to easily identify people when the circumstances deem it necessary. On the other hand, there is a need to address the privacy issues surrounding the ability to identify people who do not wish to be identified or control the access on who may identify them and the purpose for the identification.

SUMMARY OF THE INVENTION

In a first preferred aspect, there is provided a method for identification using a portable wireless communication device of a person, the method comprising:
    activating an application installed on the device to enable wireless transmission of an identification code associated with the person;
    receiving the identification code by a receiver; and
    performing a predetermined operation by the receiver in response to the received identification code;
    wherein the identification code is transferable to another device and a privacy level is applied on the identification code to control the visibility of the identification code to other devices; and
    wherein the identification code is transmitted directly by a wireless transmitter of the portable wireless communication device to the receiver.

The predetermined operation may be searching a database accessible by the receiver to retrieve the details of the person associated with the received identification code.

The identification code may contain information including: a header, an identification string, content such as text, location information, graphics, hyperlinks, audio and video, and type of identification code.

The identification code may represent the person or a group of people.

The application may be downloaded to the portable wireless communication device

The application may be executed on a platform for the portable wireless communication, the platform for managing applications and controlling a mode of wireless transmission of the identification code.

The mode of direct wireless transmission may be any one from the group consisting of: WiFi, Near Field Communication (NFC), Bluetooth and infrared.

The transmission range of the identification code from the device may be selected by the person and the corresponding wireless transmission mode is manually selected or automatically selected.

The identification code may be encrypted.

The receiver, another device and other devices may be portable wireless communication devices.

Multiple identification codes may be broadcast by the portable wireless communication device.

In a second aspect, there is provided a broadcast system for identification using a portable wireless communication device of a person, the system comprising:
    a platform installed on the device to enable wireless transmission of an identification code associated with the person;
    the platform receiving the identification code by a receiver; and
    the platform performing a predetermined operation by the receiver in response to the received identification code;
    wherein the identification code is transferable to another device and a privacy level is applied on the identification code to control the visibility of the identification code to other devices; and
    wherein the identification code is transmitted directly by a wireless transmitter of the portable wireless communication device to the receiver.

In a third aspect, there is provided a platform for identification using a portable wireless communication device of a person, the platform comprising:
    an application store for storing applications on the device to enable wireless transmission of an identification code associated with the person;
    a receiver for the application to receive the identification code; and
    a processing module to perform a predetermined operation in response to the received identification code;
    wherein the identification code is transferable to another device and a privacy level is applied on the identification code to control the visibility of the identification code to other devices; and
wherein the identification code is transmitted directly by a wireless transmitter of the portable wireless communication device to the receiver.

BRIEF DESCRIPTION OF THE DRAWINGS

An example of the invention will now be described with reference to the accompanying drawings, in which.

DETAILED DESCRIPTION OF THE DRAWINGS

Figure 1:
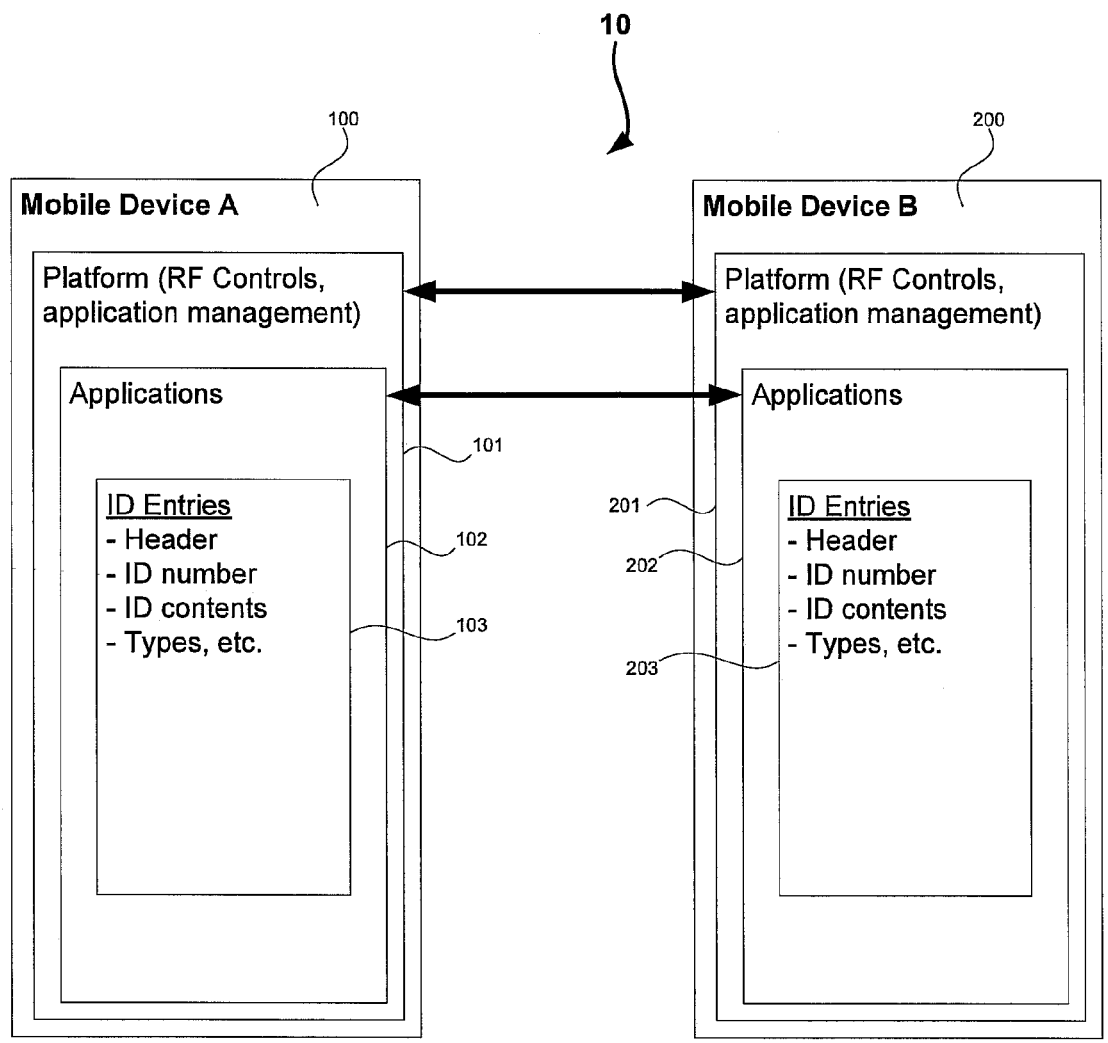
FIG. 1 is an interaction diagram of two portable communication devices interacting with each other in accordance with a preferred embodiment of the present invention.
Figure 2:
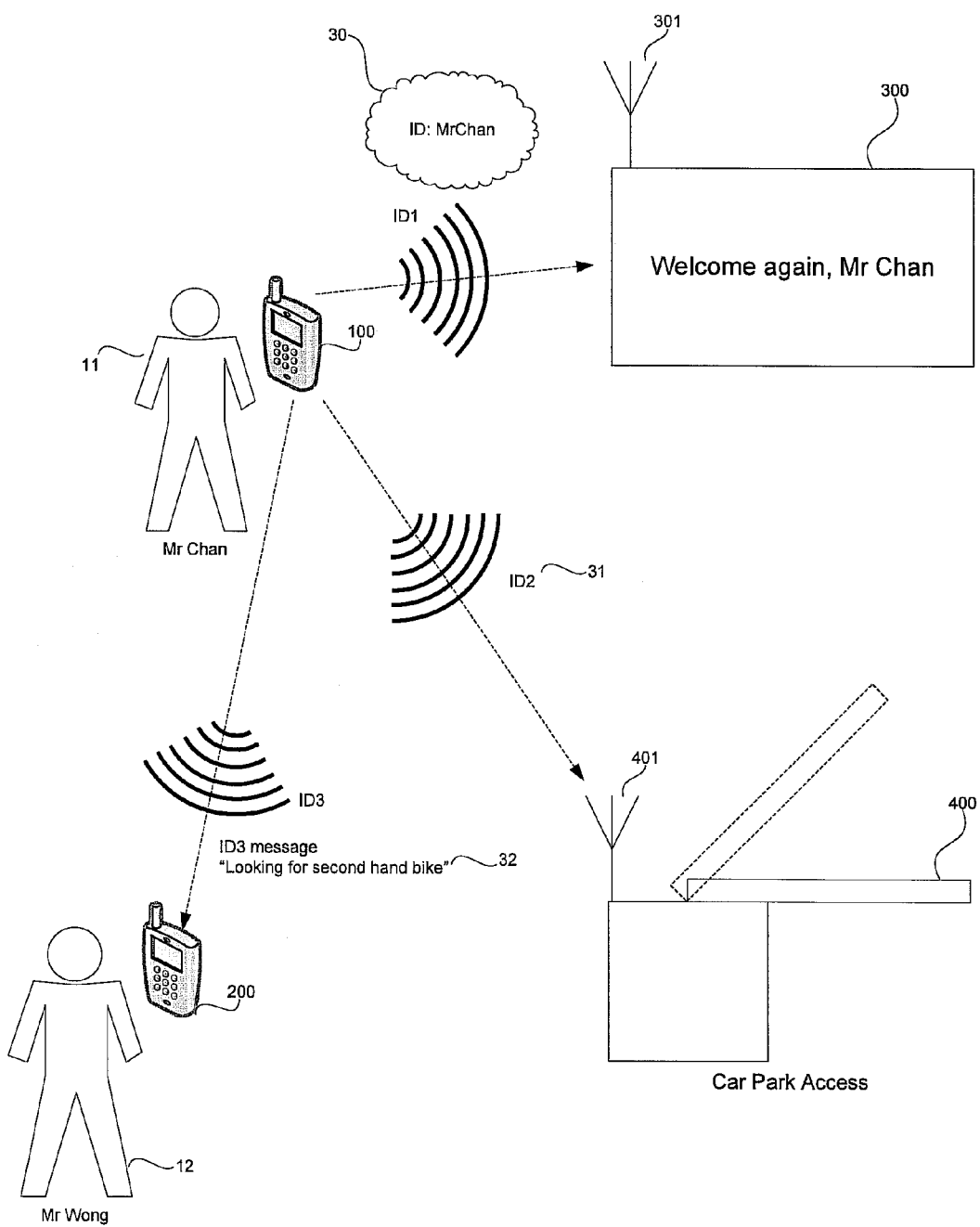
FIG. 2 is a block diagram of the broadcast system in accordance with a preferred embodiment of the present invention.

The drawings and the following discussion are intended to provide a brief, general description of a suitable computing environment in which the present invention may be implemented. Although not required, the invention will be described in the general context of computer-executable instructions, such as program modules, being executed by a computer such as a personal computer, laptop computer, notebook computer, tablet computer, PDA and the like. Generally, program modules include routines, programs, characters, components, data structures, that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring to the drawings, a method and system 10 for identification using a portable wireless communication device 100 of a person is provided. The method generally comprises: activating an application 102 installed on the device 100 to enable wireless transmission of an identification code 103 associated with the person. The identification code 103 is transmitted directly by a wireless transmitter of the portable wireless communication device 100 to the receiver 200. When the identification code 103 is received by a receiver 200, a predetermined operation is performed by the receiver 200 after the identification code is processed by the application 202 on the receiver. The identification code 103 is transferable to another device 200. A privacy level is applied on the identification code 103 to control the visibility of the identification code 103 to other devices. The two device may exchange identification codes 103, 203 to subsequently recognise each other automatically.

The method uses a mobile device 100 to broadcast an identification code 103 using any local wireless system specifically excluding a GSM/CDMA/3G phone network. Wireless methods include WiFi, Near Field Communication (NFC), Bluetooth or Infrared (IR) which have a transmission distance range about 10 meters or less. Multiple identification codes 103 may be broadcast by the same mobile device 100. This does not affect the communication port that is originally used for data/voice transfer, for example, a Bluetooth headset or WiFi communication for Internet access. Using WiFi is considered to be direct transmission from the mobile device 100 to another device 200 as it does not require the use of a GSM network tower or a SIM card. On the other hand, WiFi is a locally based area network using a wireless router and therefore does not require expensive communications infrastructure to be deployed.

Preferably, the identification code (ID) 103 is unique and may be assigned by a single centralized assigning agent, for example, a central database. This may keep track of generated IDs to avoid conflict or clashing of IDs 103 when in use.

The ID 103 is in the form of letters, numbers or a combination of both. In one example, the ID 103 is encrypted to ensure secure communication with the mobile device 100 and other devices 200. The ID 103 may represent an individual or a social group. The significance and meaning of the ID 103 may only be known when used in conjunction with a database. The schema of the form of the ID 103 may be unrecognizable by one application but is recognizable to another through pattern matching. Therefore, it is advantageous that a universal schema for IDs is not required in the present system 10 because it enables third party application developers to freely develop their own communities and functionality without constraints on the form of the ID.

A mobile device 100 is able to broadcast more than one ID 103 at the same time. This enables multiple applications 102 to operate at the same time on the mobile device 100 using different IDs 103. The ID 103 is transferable or exchangeable between mobile devices 100, 200 and functions similar to a physical key. The ID 103 can be invisible made to prevent unwanted parties from being able to see it being broadcast. The privacy level of the ID 103 is user configurable to control who may see it, when it may be seen, who may receive it or respond to it.

The platform 101 for the broadcast system 10 is locally stored on the mobile device 100. The platform 101 may be downloaded by the user or pre-installed by the manufacturer of the mobile device 100. The platform 101 provides an interface for broadcasting and management of the ID 103, and to activate/deactivate broadcasting of the ID 103. The platform 101 interacts with applications 102 which use the IDs 103 and provides low level core functionality in relation to ID broadcasting (communication, power transmission level) and privacy control. The applications 102 provide advanced and intelligent functions using the ID and typically are developed by third party application providers. Applications 101 differ from the platform 103 because they have a user interface and perform specific and high level functions and interactions that are meaningful for the user, such as increasing productivity, searching and retrieving information, communicating information to other device and identification purposes. The platform 101 manages the applications 102 by allowing users to add new applications by download through the Internet or by transmission from another mobile device 200. The platform 101 also allows disabling or deleting of applications 102 stored on the mobile device 100. Privacy control provided by the platform 101 is flexible and sophisticated. For example, the privacy level may be set by a user to only permit trusted parties to see the ID 103. Also, the transmission range for broadcast of the ID 103 is definable by adjusting the transmission power of the mobile device 100 for the ID 103.

Applications 102 which access the functions provided by the platform offer a higher level of functionality for the user. Applications 102 may regularly scan for broadcasted IDs 103 and display predetermined IDs 103 which meet a criteria defined by the user. An application 102 can display the content of an ID 103, for example, text, location information, graphics, hyperlinks, video, audio, messages, etc. Applications 102 enable the user to add, delete, transfer or exchange IDs 103 with other mobile devices 200. The ID 103 itself and its contents are editable through a user interface of the application 102. Applications 102 also allow the users to control connections to a server if one is required for the application 103, for example, a patient records database server for a medical application. Some connections are encrypted or password protected which requires the user to input these into the login module for the application 103 before a successful connection can be made. In other instances, applications 103 which require high bandwidth such as video streaming, can alert the user when there is insufficient bandwidth available so that the user can close other connections and free up more bandwidth.

A selection of applications 102 is described that uses a single ID 103 or multiple different IDs 103. These applications 102 may be executed independently or operated concurrently with each other on the same mobile device 100. These applications 102 include:

1. Providing patient information or health insurance information during a medical emergency. This application is able to speed up the admission process because the patient does not need to complete a length form and questionnaire upon admission as it can be retrieved based on their ID.
2. Providing a retail shop or restaurant with customer information such as number of repeated visits, duration of visit, expenditure, food ordered. This would improve customer service and customer relationship management (CRM) activities such as marketing and promotions.
3. Enabling personal gaming opportunities at casinos by knowing more about customers such as their favourite game, their usual times of visit, and their preferred table.
4. Accessing control of car parks by automated billing, duration of parking, and usual times of parking
5. Taking attendance of people at meetings or school lessons by reading the broadcasted IDs.
6. Delivering a personal message to people passing by with the broadcasted ID.
7. Enabling personalized message board or advertising as a person is passing by through a broadcasted ID and personalize any promotions or merchant offers based on the user's preferences and tastes.
8. Enabling an automated system for home appliances through activation and control depending on the ID received.
9. Locating the mobile device a person to find lost children or the elderly
10. Providing signals for search and rescue of people during disaster or emergency to locate missing people.

Figure 3:
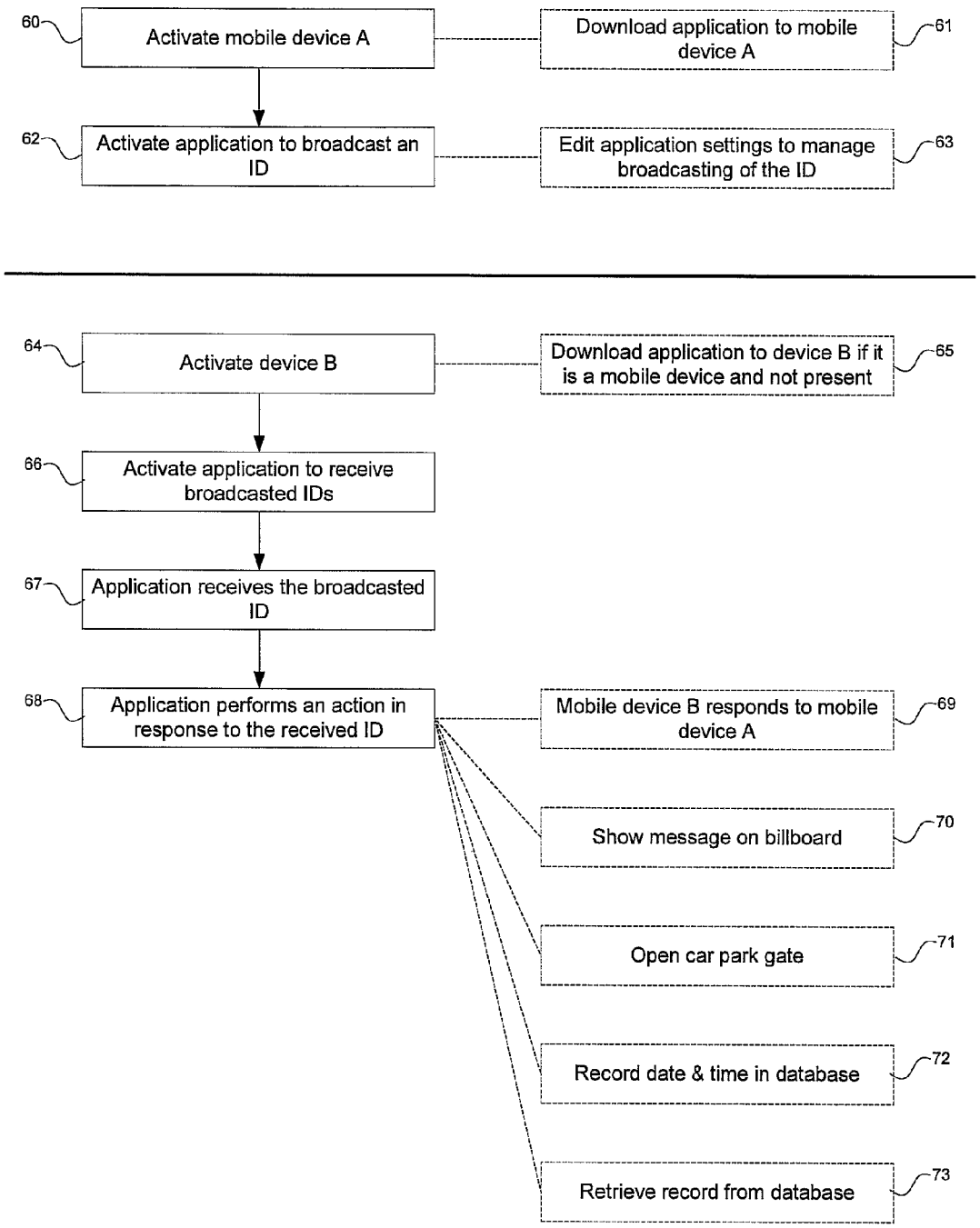
FIG. 3 is a process flow diagram of a method for identification using a portable wireless communication device of a person.

Referring to FIG. 3, in a typical scenario, a user turns on (60) their mobile phone 100. If they do not have an application to broadcast their ID, they download (61) from the Internet or have one transferred from another person. The platform 101 is activated to allow access to its core functions by applications 102. The application 102 is activated (62) to broadcast their ID. The settings of the application 102 can be edited (63) according to user preferences. Another device is activated (64), for example, another mobile phone 200, billboard, car park gate, or wireless receiver. If the device is a mobile phone 200, the user may download (65) the necessary application 202 if it not already present on the mobile phone 200. An application 202 for the device is activated (66) to continuously monitor for broadcasted IDs within range of the mobile phone 100. If the ID 103 is detected as being for the relevant application 202, it is received (67) and processed by the application 202. The application performs (68) an action in response to receiving the ID 103. For example, if the device is a mobile phone 200 it will respond (69) to the originating mobile phone 100 appropriately such as exchanging details or information. The ID 32 transmitted to the mobile phone 200 may alert them that the user of mobile phone 100 is "Looking for a second hand bike". If the device is a billboard, a personalized message may be displayed (70) on the billboard such as "Hello, Mr Chan", as Mr Chan was part of the contents of the ID entry of the ID 31. If the device is a car park gate, the car park gate opens (71) upon receipt of the ID 32 and records the details of the ID 32 for billing and tracking entry/exit times from the car park. If the device is a wireless receiver and is operatively connected to a database and software application, a date and time may be recorded (72) in the database about when the ID was received or a record from the database may be retrieved (73) that is associated with the ID.

Figure 4:
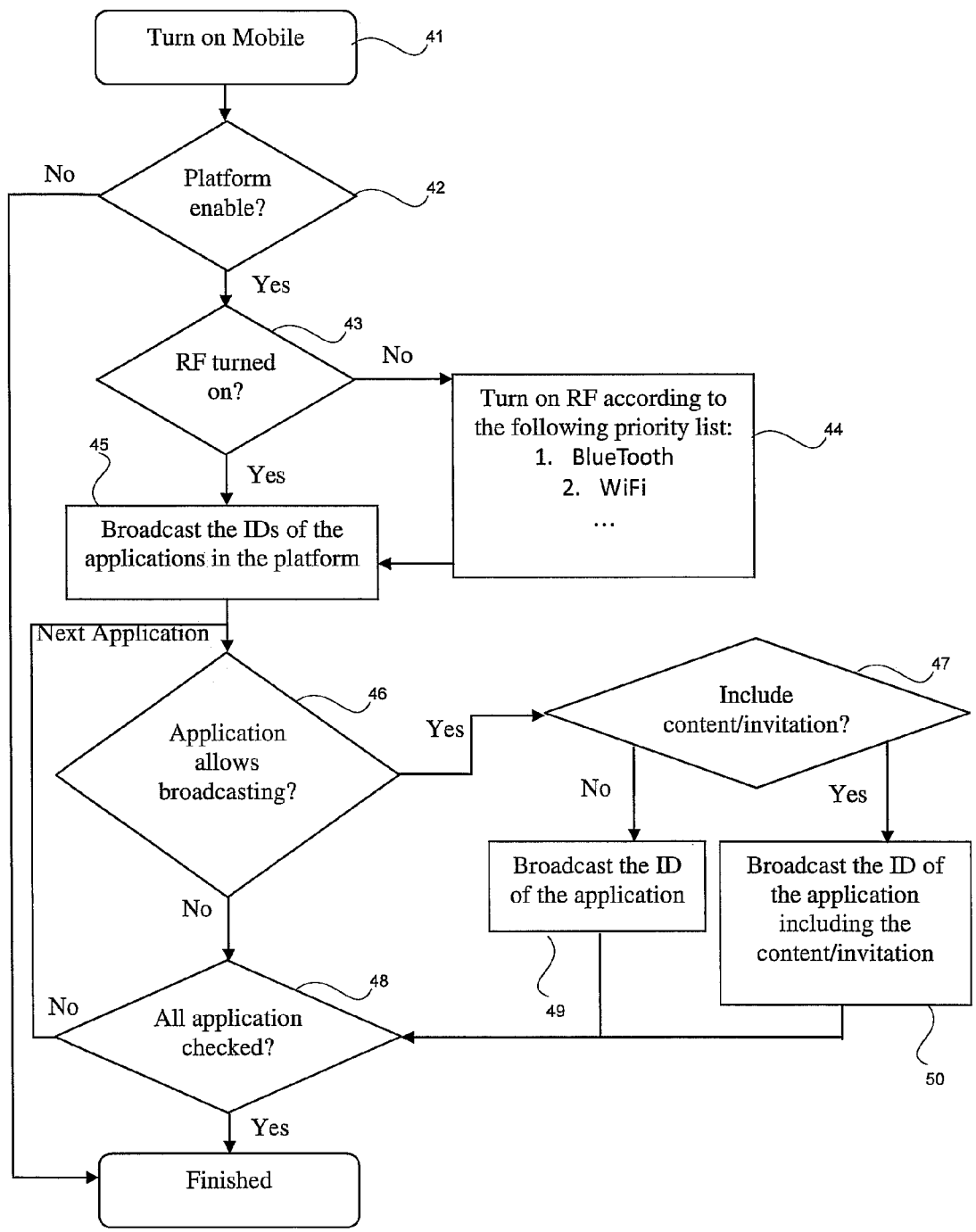
FIG. 4 is a flow chart illustrating auto-broadcasting of IDs in a platform of a mobile device.

Referring to FIG. 4, is a flow chart illustrating auto-broadcasting of IDs 32 in the platform 101 of a mobile device 100. The mobile device 100 is activated (41). A check is performed to detect whether the platform 101 is enabled (42). If not enabled, no auto-broadcasting of the IDs 32 is possible. If enabled, the RF transmitter is checked to detect whether it is activated (43). If the RF transmitter is not activated, it is activated (44) according to a priority list, for example, BlueTooth then WiFi, etc. If the RF transmitter is already activated, the IDs 32 of the applications 102 in the platform 101 are broadcast (45). A check (46) is performed to determine whether an application 102 allows broadcasting of its ID 32. If allowed, a check (47) is performed to determine whether content or an invitation is included with the broadcast of the ID 32. If not included, only the ID 32 is broadcast (49). If included, content or an invitation is included (50) with the broadcast of the ID 32. All applications 102 are checked (48) to determine whether broadcasting of their ID 32 is permitted.

Figure 5:
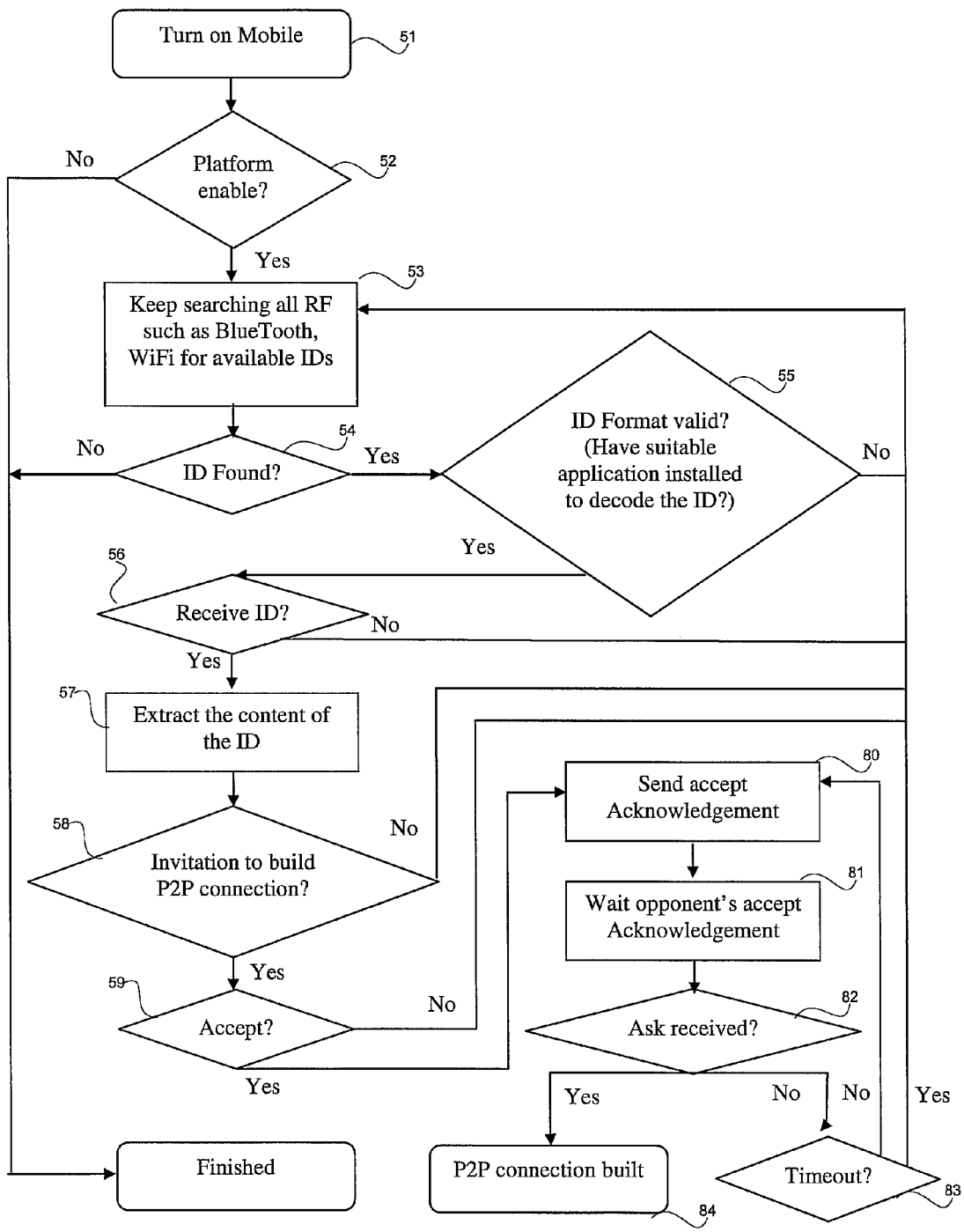
FIG. 5 is a flow chart illustrating auto-searching of IDs in a platform of a mobile device.

Referring to FIG. 5, is a flow chart illustrating auto-searching of IDs 32 in the platform 101 of a mobile device 100. The mobile device 100 is activated (51). A check is performed to detect whether the platform 101 is enabled (52). If not enabled, no auto-broadcasting of the IDs 32 is possible. The platform 101 searches (53) all RF transmissions such as BlueTooth, WiFi, etc for available IDs 32. If an ID 32 is found (54), the format of it is checked (55) to determine whether it is valid and there is an appropriate application 102 to decode and use the ID 32 on the mobile device 100. If the format is invalid, there is a timeout (83). If the format of the detected ID 32 is valid, the ID 32 is received (56). Next, the content of the ID 32 is extracted (57). A check (58) for an invitation to build a peer to peer connection is performed. If there is an invitation, the user may accept (59) it. If the user does not accept the invitation, there is a timeout (83). If the invitation is accepted, an accept acknowledgement is sent (80) to the inviting party. The inviting party will acknowledge (81) the accept acknowledgement and if received (82), a peer to peer connection is established (84). If no acknowledgement is received, there is a timeout (83). The machine searches (86) all RF transmissions such as BlueTooth, WiFi, etc for IDs 32 transmitted by mobile devices 100. If an ID 32 is found (87), the format of it is checked (88) to determine whether it is valid. If the format is valid, the relevant data is retrieved (89) from a database if appropriate to the application. The ID 32 is searched in the database to retrieve the relevant record and a predetermined operation is performed by either the mobile device 100 or the machine. If no database access is necessary, a check (91) is performed to determine whether any other operation is required to be executed. If there is such an operation, the operation is performed (92).

Figure 6:
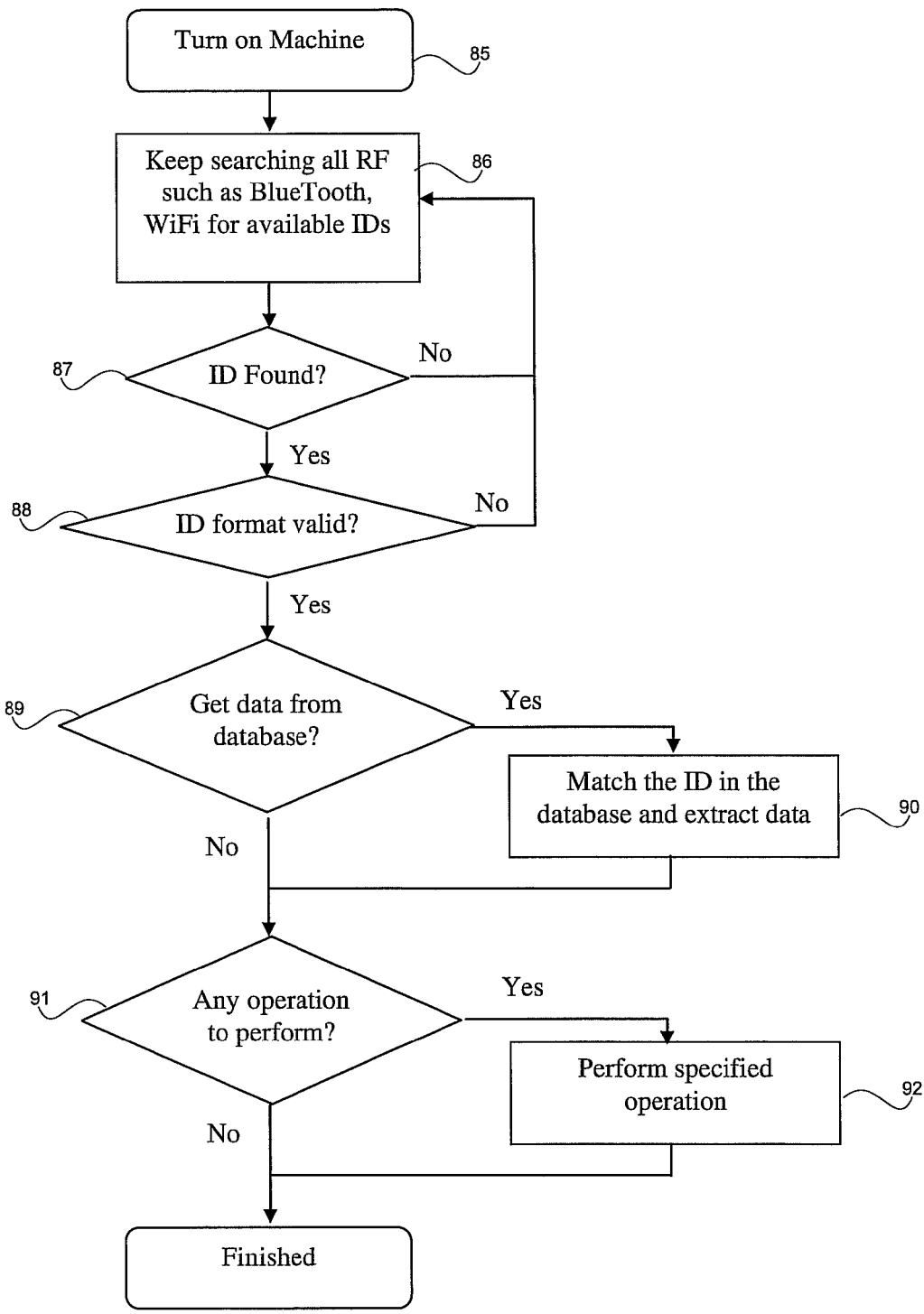
FIG. 6 is a flow chart illustrating the operation of a stationary ID-receiving machine.

Referring to FIG. 6, is a flow chart illustrating the operation of a stationary ID-receiving machine 300, 400. The machine is activated (85).

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

We claim:

1. A method for identification using a portable wireless communication device of a person, the method comprising:
   activating an application that is downloaded from the Internet or transferred from another device, the downloaded application being installed on the device to enable wireless transmission of an identification code that represents the person or a group of people where the person is a member of the group;
   receiving the identification code by a receiver, wherein secure communication between the device and the receiver is only permitted if the pattern of the identification code of the person is recognised by the receiver; and searching a database remotely located from the device and the receiver that is accessible by the receiver to retrieve the details of the person associated with the received identification code;

wherein the identification code is transferable to another device and a privacy level is applied on the identification code to control the visibility of the identification code to other devices, and to control the permission of other devices to receive the identification code or respond to the received identification code;

wherein the identification code is transmitted directly by a wireless transmitter of the device to the receiver;

wherein the identification code contains information including: a header, an identification string, content such as text, location information, graphics, hyperlinks, audio and video, and type of identification code.

2. The method according to claim 1, wherein the application is executed on a platform for the portable wireless communication, the platform for managing applications and controlling a mode of wireless transmission of the identification code.

3. The method according to claim 2, wherein the mode of direct wireless transmission is any one from the group consisting of: WiFi, Near Field Communication (NFC), Bluetooth and infrared.

4. The method according to claim 2, wherein the transmission range of the identification code from the device is selected by the person and the corresponding wireless transmission mode is manually selected or automatically selected.

5. The method according to claim 1, wherein the identification code is encrypted.

6. The method according to claim 1, wherein the receiver, another device and other devices are portable wireless communication devices.

7. The method according to claim 1, wherein multiple identification codes are broadcast by the portable wireless communication device.

8. A broadcast system for identification using a portable wireless communication device of a person, the system comprising:

a platform that is downloaded from the Internet or transferred from another device, the platform being installed on the device to enable wireless transmission of an identification code that represents the person or a group of people where the person is a member of the group;

the platform receiving the identification code by a receiver, wherein secure communication between the device and the receiver is only permitted if the pattern of the identification code of the person is recognised by the receiver; and the platform searching a database remotely located from the device and the receiver that is accessible by the receiver to retrieve the details of the person associated with the received identification code;

wherein the identification code is transferable to another device and a privacy level is applied on the identification code to control the visibility of the identification code to other devices, and to control the permission of other devices to receive the identification code or respond to the received identification code;

wherein the identification code is transmitted directly by a wireless transmitter of the device to the receiver; and wherein the identification code contains information including: a header, an identification string, content such as text, location information, graphics, hyperlinks, audio and video, and type of identification code.

9. The system according to claim 8, wherein multiple identification codes are broadcast by the portable wireless communication device.

10. A platform for identification using a portable wireless communication device of a person, the platform comprising:

an application store for storing applications on the device that have been downloaded from the Internet or transferred from another device, and one of the stored applications enabling wireless transmission of an identification code that represents the person or a group of people where the person is a member of the group;

a receiver for the application to receive the identification code, wherein secure communication between the device and the receiver is only permitted if the pattern of the identification code of the person is recognised by the receiver; and a processing module to search a database remotely located from the device and the receiver that is accessible by the receiver to retrieve the details of the person associated with the received identification code;

wherein the identification code is transferable to another device and a privacy level is applied on the identification code to control the visibility of the identification code to other devices, and to control the permission of other devices to receive the identification code or respond to the received identification code wherein the identification code is transmitted directly by a wireless transmitter of the device to the receiver; and wherein the identification code contains information including: a header, an identification string, content such as text, location information, graphics, hyperlinks, audio and video, and type of identification code.

11. The platform according to claim 10, wherein multiple identification codes are broadcast by the portable wireless communication device.

* * * * *